June 5, 1962 S. BOORUJY 3,037,635
APPARATUS FOR FILTERING LIQUID
Filed July 7, 1954 4 Sheets-Sheet 1

INVENTOR.
Salem Boorujy
BY Ridsdale Ellis
Attorney

June 5, 1962
S. BOORUJY
3,037,635
APPARATUS FOR FILTERING LIQUID
Filed July 7, 1954
4 Sheets-Sheet 2
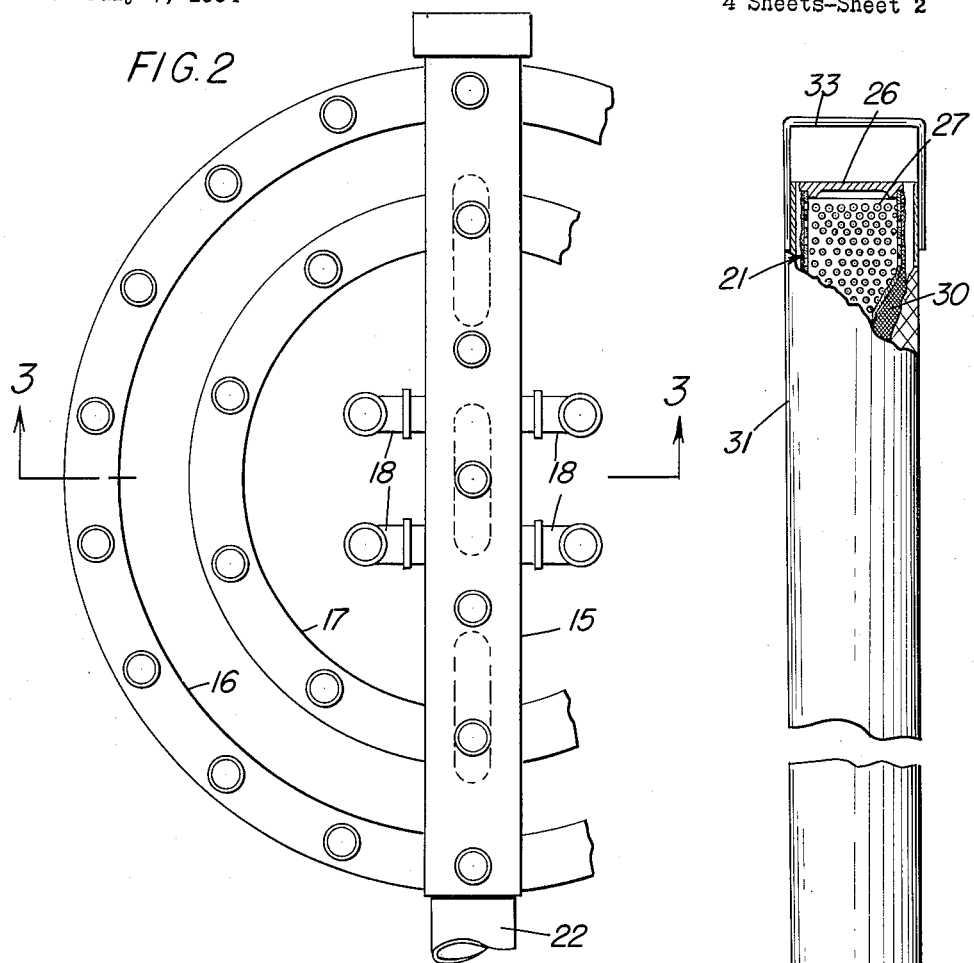
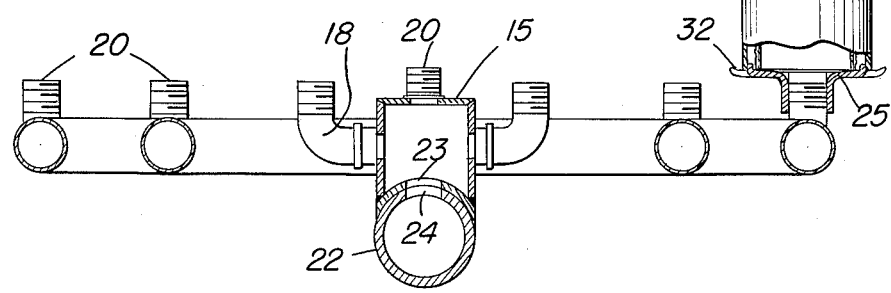
FIG.3
INVENTOR.
Salem Boorujy
BY Ridsdale Ellis
Attorney June 5, 1962  S. BOORUJY  3,037,635
APPARATUS FOR FILTERING LIQUID
Filed July 7, 1954  4 Sheets-Sheet 3
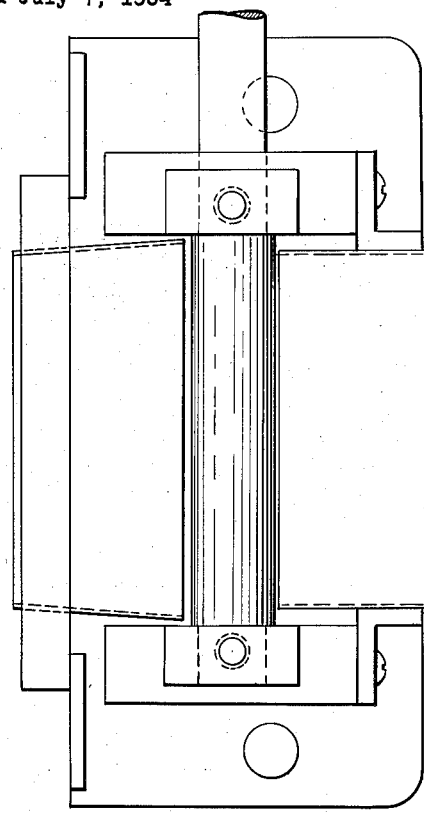
FIG. 4
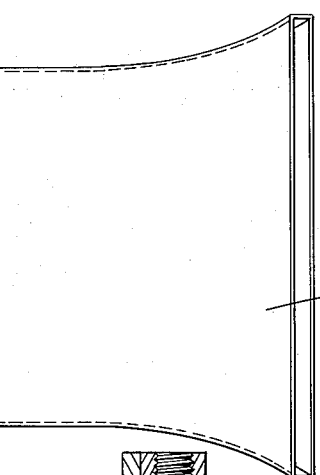
FIG. 6
FIG. 5
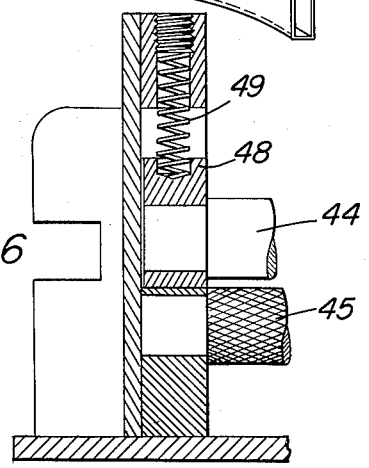
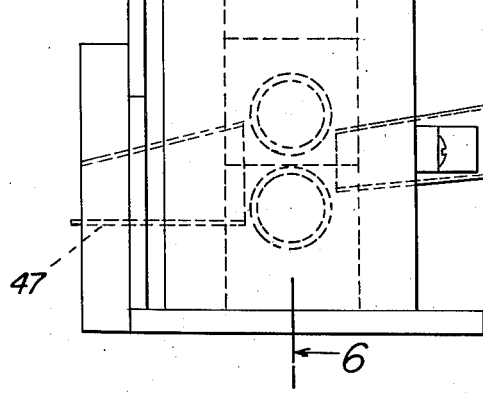
INVENTOR.
Salem Boorujy
BY Ridsdale Ellis
Attorney.

INVENTOR.
Salem Boorujy,
BY Ridsdale Ellis
ATTORNEY.

3,037,635
APPARATUS FOR FILTERING LIQUID
Salem Boorujy, Chatham, N.J., assignor to White Filter Sales Co., Kenilworth, N.J., a corporation of New Jersey
Filed July 7, 1954, Ser. No. 441,895
5 Claims. (Cl. 210—330)

This invention relates to a filtering apparatus designed primarily, but not exclusively, for the filtration of dry-cleaning solvents.

Broadly, the invention consists of adding to the liquid a fibrous filter aid, such as finely-divided shredded paper, stirring and then introducing the dilute slurry into a filter chamber containing a number of fine-mesh filter elements, usually cylindrical in form. The shredded paper is retained by the filter element. The layer of paper fibers so deposited forms the real filter medium. The flow of liquid is radially inwards so that the layer of fibers builds up over the outside of the filter elements while the clear filtrate passes through to a manifold connecting the individual filter elements to a single common discharge pipe. Heretofore it has been customary to use as the filter aid diatomaceous earth. Finely shredded newspaper has been found to be much superior in many ways.

First, its cost is practically zero and a supply is always available.

Second, much less power is required to force the cleaning fluid through a layer of shredded paper than through a layer of diatomaceous earth. A head of 2 to 3 lbs. per sq. in. is enough for paper, while with diatomaceous earth the pressure is usually 10 to 15 lbs.

Third, using paper the filtrate is sparkingly clear, while that obtained with diatomaceous earth is nearly always slightly cloudy.

Fourth, the dirty shredded paper is more readily removed from the filter and disposed of than is the case with diatomaceous earth.

The satisfactory use of finely shredded fibrous material, such as old newspaper, as a filter medium for dry-cleaning fluids involves three factors:

(1) The preparation of an initial filtering layer prior to the use of the filter. Until a substantial layer has built up, the filtrate will be cloudy.

(2) The gradual building up of the filtering layer by the application of additional amounts of finely shredded material to the initial filtering layer to prevent the sliming over of such initial filter layer.

(3) The maintenance of a filter layer sufficiently thick to insure a clear filtrate throughout the entire filtering operation. As the layer builds up in thickness, its outer layers may peel off without harmfully affecting subsequent filtration. However, if the entire thickness peels off any part of the filter surface, the filtrate passing through such part will be cloudy until a filter layer of substantial thickness has built up once more.

From time to time, usually at the end of the day's operation, the layer of shredded paper or the like is removed from the filter elements and discharged into a chamber where it is dried as far as practicable and then disposed of. One method of removing this layer is to reverse the flow of liquid through the filter element for a short time. Instead of removing the paper layer hydraulically in this manner, it may also be removed mechanically, thereby avoiding having to pass a portion of the liquid through the filter element twice.

Conveniently this mechanical removal can be accomplished by means of relatively coarsely perforated or expanded metal cylinders loosely surrounding the filter elements. The openings in these cylinders are large enough to permit the shredded paper to pass through readily for subsequent temporary retention on the outer surfaces of the filter elements. When these cylinders are reciprocated up and down, they disturb the paper layer on the filter elements and also agitate the liquid in the neighborhood of the latter so that the paper is washed off the wire mesh in coarse flocks.

It has been found that in operating the apparatus the space between the outer coarsely-perforated cylinders and the inner fine-mesh cylinders fills up with the paper shreds which are retained in such position by the outer cylinders until the latter are reciprocated up and down.

The filtration operation may be continuous or intermittent depending on the method used for the washing procedure. This varies from plant to plant. In either case, it is the function of the outer expanded-metal cylinders to retain or hold in place the relatively thick, loosely formed paper mass on the inner filter elements. This function is required both during filtration and when flow through the filter has been stopped for any reason.

During filtration the loosely formed paper filter cake on the inner elements is acted on by flow currents within the filter chamber which are at times directed tangentially to the cylindrical surface of the cake. This condition results from the configuration of the elements within the chamber and the way in which the fluid enters the chamber. Because of this tangential flow, eddy currents, etc., some of the loose paper filter cake would be scoured or otherwise swept off the inner filter cylinders. This occurs most frequently on the outer elements of a group arranged in a circular chamber. The outer expanded-metal cylinders prevent this occurrence by giving the required support to the paper mass which builds and knits about the open mesh networks of these cylinders forming a felt-like deposit.

When flow through the filter is stopped or interrupted for any reason, the outer expanded-metal cylinders again function as retaining devices and prevent the loosely formed cake from failing and/or sliding from the inner cylinders. With no support, the paper filter cake slides downward and off the inner element in the form of felt-like tubes.

The reason for this action is apparent from the fact that the formed paper filter cake possesses elastic properties. When flow is stopped, the pressure on the cake is relieved, and the latter expands from its slightly compressed state. Upon expanding, it fits more loosely around the inner cylinder and under its own weight slides down or falls off. Therefore, it is the purpose of the outer expanded-metal elements, over which the paper knits, to prevent both the slight expansion of the cake and the sliding or falling off of the cake during any period when flow through the filter ceases.

When it is desired to remove the filter cake from the elements for the purpose of cleaning the filter, the outer expanded-metal elements which extend the full length of the inner element are rapidly reciprocated up and down. In so doing, they disturb the paper layer on the inner filter elements and also agitate the liquid in the neighborhood of the latter so that the paper is washed off the inner cylinders in coarse flocks.

The outer cylinders, therefore, serve a dual function. First, they insure the retention of a filter layer thick enough to give good results for the time that the filter is operating as such. Second, after the filter period is over, they very effectively remove all of the shredded paper surrounding the inner cylinders.

To form the initial filtering layer prior to the use of the filter as such, shredded paper is added to a batch of cleaning fluid and then the slurry is pumped through the filter to build up a filter layer of the necessary thickness. A convenient way of insuring that such has been done is to use dirty cleaning fluid in this step of the operation. The slurry is then pumped through the filter until the filtrate is perfectly clear. As the first shreds of paper are being caught by the fine-mesh cylinders, there are not enough of them to retain all the dirt. Hence the need for re-cycling until the filtrate is clear, which shows that there is enough paper surrounding the fine-mesh cylinders for satisfactory filtering operations.

The amount of paper required must be enough to give an initial layer of a minimum thickness, so that the total amount required is proportional to the total area of the fine-mesh cylinders. It has been found that each square foot of such cylinders requires about 0.1 lb. of paper. Thus, if the total area of the fine-mesh cylinders is 57 square feet, 5 to 6 lbs. of paper in 200 gallons of fluid will suffice.

Once the initial layer has been formed, much less paper per gallon of dirty cleaning fluid is required to prevent sliming than was needed to produce the initial filtering layer. For normally dirty fluid, 1 to 2 ozs. of paper per 100 gallons is enough to prevent sliming over of the filter layer.

The removal of the filter cake by reciprocation of the outer cylinders should not take place until filtering action has ceased, which means that the discharge outlet from the filter elements has been closed. There is then no suction due to flow of liquid into the interior of the filter elements to aid the adherence of the shredded paper to the filter elements. Also it is advisable that, when this agitation takes place, the wire mesh filter elements are completely immersed in liquid so that all parts of such elements are subjected to the washing action resulting from the agitation of the perforated cylinders.

In the preferred mode of operation, at the end of the day the filter cake is removed from the fine-mesh filter elements and sluiced into a container containing a filter element, such as a felt bag, to be separated from the fluid as far as possible. This sluicing operation is aided by initiating a flow of liquid from the filter chamber into such felt bag and back into the filter chamber before reciprocating the outer cylinders to wash off the filter cake. Such flow of fluid prevents clogging of the bottom of the filter chamber.

Old newspapers can be used very satisfactorily and are better adapted for the purpose than glazed, highly loaded papers. The printer's ink on newspaper does not seem to aid or hinder the filtering action of the shredded paper. It is important to reduce the paper to very fine shreds capable of forming a continuous porous mat over the wire gauze filter surface. This means that the shredding operation should be carried far enough to destroy the sheet structure of the paper.

Two forms of apparatus suitable for carrying out the invention are illustrated, by way of example, in the accompanying drawings, wherein:

FIG. 2 is a plan view of the manifold connecting the individual filter elements to a common discharge pipe;

FIG. 3 is a section on the line 3—3 of FIG. 2, showing, partly in section, one of the individual filter elements in position on the manifold;

FIG. 4 is a plan view of the feeder which supplies paper to the shredding machine;

FIG. 5 is a side view of the feeder shown in FIG. 4;

FIG. 6 is a section on the line 6—6 of FIG. 5; and

Figure 1:
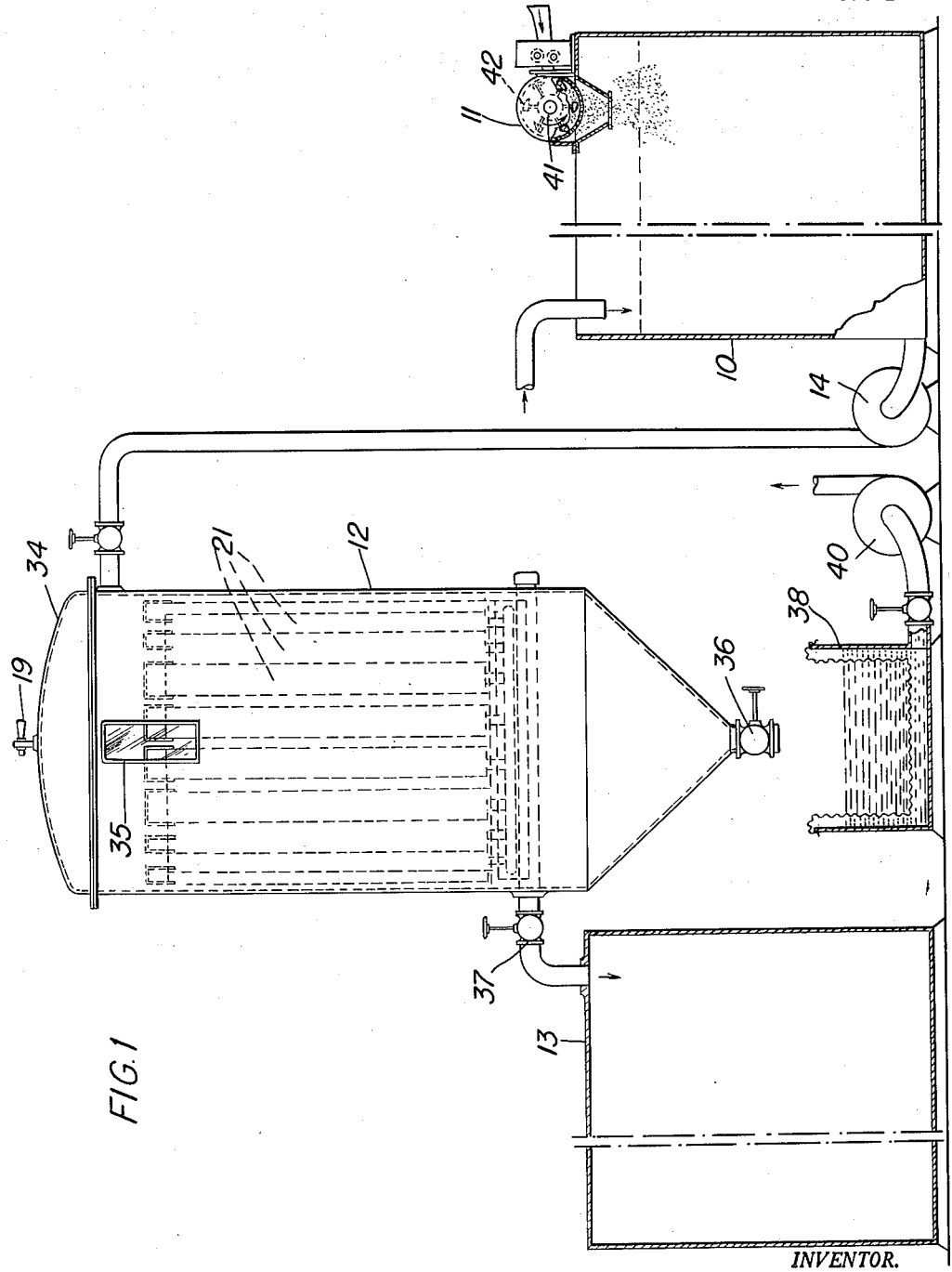
FIG. 1 is a side elevation, partly in section, of a filter and associated apparatus embodying my invention.

The filter assembly comprises a mixing tank 10, a paper shredder 11, a filter chamber 12 and a storage reservoir 13. Dirty cleaning fluid is run into the tank 10 and then shredded paper is added by passing a few sheets of waste paper through the shredder 11. Next the mixture is stirred thoroughly and pumped by pump 14 into the filter chamber 12. A petcock 19 allows the air in the filter chamber to escape as dirty liquid is pumped into it.

Near the bottom of the chamber 12 is a manifold comprising a box 15 from the sides of which extend semi-circular tubes 16 and 17 and elbows 18. The box 15 and tubes 16 and 17 have upstanding threaded nipples 20 to receive the lower ends of a series of individual filter elements 21. The upstanding ends of the elbows 18 are similarly threaded for the same purpose. As shown, there are 35 individual filter elements, although in FIG. 3 only one of them is illustrated.

The box 15 has a rounded bottom to enable it to fit the top of a discharge pipe 22 to which the box is welded. Registering openings 23 and 24 in the bottom of the box 15 and the top of the pipe 22, respectively, permit liquid to pass from the box 15 into the pipe 22. The individual filter elements are cylindrical in form and are constructed to allow liquid to flow radially inwards through the filter material and then discharge downwards through the manifold into the discharge pipe 22.

Each filter element comprises a bottom 25 having threaded engagement with one of the nipples 20 or one of the elbows 18, and a top 26. Rigidly connecting the bottom 25 to the top 26 is a stiff perforated cylinder 27 around which is wrapped a sheet of fine-mesh wire gauze to form a cylindrical filter 30 which acts the the retaining means for the paper fibers suspended in the dirty liquid. The function of the perforated cylinder is to support the flexible gauze cylinder 30 and prevent its collapse under the externally applied pressure.

Periodically, the accumulated layer of paper fibers has to be removed. In the form of apparatus shown in FIGS. 1 to 3, the means employed for this purpose comprises a cylinder 31 of expanded metal loosely surrounding the gauze cylinder and normally resting on a series of lugs 32 extending outwardly from the periphery of the bottom 25. Various devices may be used for raising and lowering the cylinder 31. The particular device illustrated consists of a handle or bail 33 welded to the top of the cylinder 31 by which the cylinder 31 can be moved up and down by hand, after the top 34 of the filter chamber has been removed. Raising and lowering the cylinder 31 disturbs the layer of fibers deposited on the wire mesh cylinder 30. Also the reciprocation of the cylinder 31 causes eddy currents in the liquid around the filter elements which tend to wash the fibers off the wire gauze surface. On standing, the fibers shaken and washed off the wire mesh will sink to the bottom of the filter chamber 12.

As previously pointed out, removal of the fiber layers as just described is best done when the liquid in the filter chamber just covers the tops of the wire gauze cylinders, leaving the upper parts of the bails 33 above the liquid surface. A sight window 35 permits the level of the liquid in the filter chamber to be adjusted as desired. When the fibers so loosened from the wire mesh cylinders have settled substantially to the bottom of the chamber, the top 34 of the latter may be replaced and a further batch or batches of liquid may then be filtered.

From time to time the fibers accumulating in the filter chamber must be removed. To facilitate such removal, the bottom of the chamber is made conical and is provided with a discharge valve 36. Below the discharge valve 36 is a filter basket 38 from the bottom of which clear liquid may be removed by a pump 40. Before opening the discharge valve 36, the petcock 19 and valve 37 are opened to allow as much liquid as possible to drain into the storage reservoir 13.

FIGS. 4, 5 and 6 show the feeding mechanism for the shredder 11. The shredder 11 is a hammer mill having a rotor 41 provided with hammers 42, preferably formed with teeth to cut and shred the paper more efficiently than the customary types of hammers used on granular material. As is usual in hammer mills, the top of the hammer chamber is imperforate while the bottom is perforated to retain the paper being shredded until it is reduced to fibers or pieces small enough to pass through such perforations.

For granular material, a hopper and feed screw are suitable. Paper, however, requires a different type of feeding mechanism. That shown comprises a pair of rolls 44 and 45, one at least of which is power-rotated by means not shown. Leading to these rolls is a flattened horn 46 into which waste paper can be stuffed until it is gripped by the rolls and thereby forced through a second flattened horn 47 having its end extending through an opening in the hammer chamber casing.

The upper roller 44 is mounted on movable bearings 48 pressed downwardly by springs 49 to insure gripping of the paper and at the same time permit separation of the rollers when the volume of the paper requires it. The lower roll having a fixed axial position should be the driven roll. The driven roll should be knurled, as shown. Whether or not the idler roll is knurled is not so important.

Figure 7:
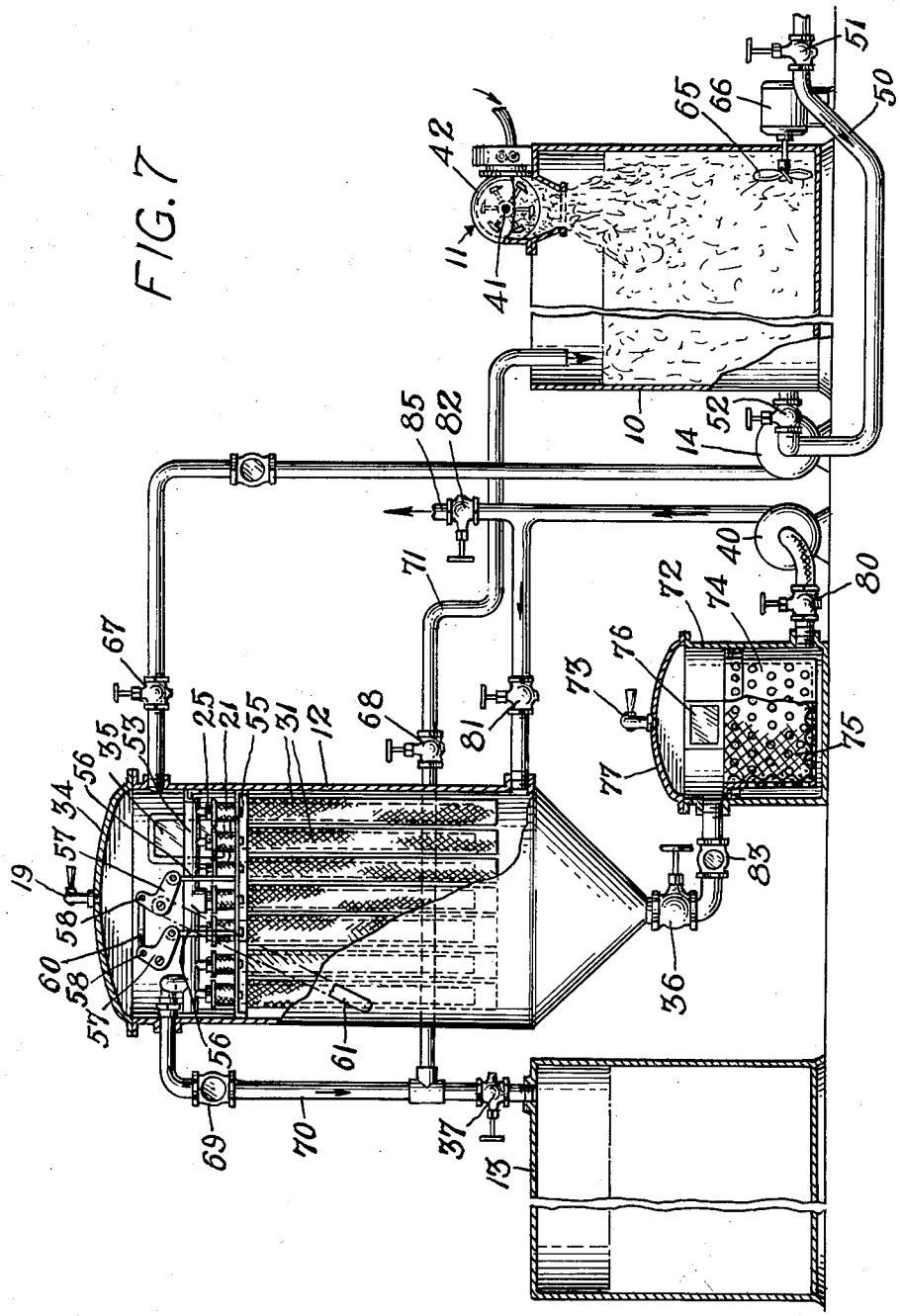
FIG. 7 is a side elevation, partly in section, of another form of filter and associated parts.

FIG. 7 shows a different form of construction in which the clear filtrate passes through the interior of the filter elements 21 upwardly instead of downwardly. It has been found that when the discharge of filtrate is at the bottom, as in the form shown in FIGS. 1 to 6, the box 15 and semi-circular tubes 16 and 17 tend to retain the filter cake washed off the filter elements and clog up the apparatus.

Another difference lies in the fact that provision is made for reciprocating the coarsely perforated cylinders without removing the top of the filter chamber.

The reference numerals used in FIG. 7 are the same as those used in FIGS. 1 to 6 except for parts changed in construction.

Dirty cleaning fluid is passed from the clothes washer into the mixing tank 10 by pipe 50 and valves 51 and 52. The filter chamber 12 contains a series of filter elements 21 constructed as shown in FIG. 3, although arranged differently as in this case they are inverted. Consequently they are closed at their bottoms and what are now their tops 25 are in threaded engagement with a corresponding series of nipples depending from a manifold 53, constructed as shown in FIG. 3, but inverted.

Around each filter element 21 is a coarsely perforated cylinder 31 of expanded metal or the like, which can be moved up and down to wash the accumulated filter cake off the elements 21. To enable all cylinders 31 to be moved simultaneously and also to enable them to be operated without removing the top 34, the tops of all the cylinders 31 are attached to a frame 55, supported by links 56 connected to bell-cranks 57 on two shafts 58. Parallel linkage 60 connects these two shafts to insure that they turn in unison, thereby keeping the frame 55 horizontal at all times. One of the shafts 58 extends through the wall of the filter chamber and on its projecting end is mounted a handle 61 by which the shafts 58 can be turned back and forth without taking off the top.

Dirty cleaning fluid is pumped into the mixing tank 10 from one of the washers. Then the requisite amount of paper is passed through the shredder 11 and thoroughly mixed with the fluid to be filtered by the agitator 65 driven by a motor 66. Valves 36 and 37 are closed, valves 67 and 68 and petcock 19 are opened, and the dilute slurry is then pumped into the filter chamber 12. When the liquid level in the latter, as seen through the sight glass 35, is above the manifold 53, the petcock 19 is closed to prevent any further escape of air. When that is done, further fluid entering the chamber 12 has to pass through the filter elements 21 and out through sight glass 69, pipe 70, valve 68 and pipe 71, back into the mixing tank 10. This is continued until the filtrate, as seen through the sight glass 69, runs clear. When that occurs, valve 37 is opened and valve 68 closed. Pump 14 is run until the mixing tank is empty, when valves 67 and 37 are closed.

The handle 61 is now swung to and fro to wash the accumulated filter cake off the elements 21 and permit it to fall down into the conical bottom of the filter chamber. When that has been done, valve 80 is closed and the valve 36 leading to the auxiliary filter 72 is opened, as is also the petcock 73 in its top 77. This auxiliary filter contains a perforated metal basket 74 and a felt bag liner 75, both removable. The petcock 73, by allowing air to escape, prevents the auxiliary filter becoming air-bound. A sight glass 76 enables the operator to see when the liquid is above the top of the basket 74 and its liner 75. When that occurs, the petcock is closed to prevent further escape of air. This is desirable to insure that liquid will not pass out through the petcock after all the air has gone.

Next, valve 82 is closed and valves 80 and 81 opened and pump 40 placed in operation to pump liquid from the bottom of the filter chamber through the auxiliary filter and back into the filter chamber. This is continued until the circulating liquid, as seen through sight glass 83, is reasonably clear, indicating that nearly all of the filter cake washed off the element 21 has been transferred to the auxiliary filter and retained there. Valves 36 and 81 are now closed and valve 82 and petcock 73 opened. Continued pumping draws the liquid out of the auxiliary filter and discharges it through pipe 85 to storage or dump or mixing tank 10, as desired. Finally, air is sucked through the filter cake, thereby largely drying it out, so that, after the top 77 of the auxiliary filter has been removed, the liner can be lifted out and the nearly dry cake shaken off.

This application is a continuation-in-part of my application Serial No. 288,232, filed May 16, 1952, now abandoned.

I claim:

1. Filtering apparatus for liquids, comprising a chamber, a substantially vertical fine-mesh filter therein, a coarsely perforated reciprocable element spaced a short distance therefrom on the intake side of the filter and a layer of coarsely shredded paper fibers between the surface of the filter and said element thick enough to give a clear filtrate, said shredded paper being removable with said element guiding it downwardly through said space.

2. Filtering apparatus for liquids, comprising a chamber, a series of vertical fine-mesh cylindrical elements therein, means for supporting a filter layer of fibrous material about the fine-mesh elements comprising coarsely perforated cylinders surrounding the fine-mesh elements and spaced therefrom a short distance to receive such filter layer, said filter layer being supported between said elements and associated cylinders and means for reciprocating said cylinders to remove said filter layers and cause them to be discharged downwardly between said cylinders and elements.

3. Filtering apparatus for liquids comprising a chamber, a series of vertical fine-mesh tubes therein each closed at the bottom, a header for filtrate in the upper part of the chamber connected to the upper ends of each of said tubes, relatively coarsely perforated cylinders loosely surrounding said tubes, means surrounding and carrying said cylinders in depending relationship thereto and means for reciprocating the aforesaid means to periodically remove the layers of material accumulated between said tubes and cylinders.

4. Filtering apparatus for liquids, comprising a chamber, a substantially vertical fine-mesh filter therein, a coarsely perforated element spaced a short distance therefrom on the intake side of the filter, a layer of shredded paper on the surface of the filter, said paper being shredded to just break up the sheet structure into relatively long coarse fibers, and means for reciprocating said element to shake and wash off the layer of paper which has collected on the surface of the fine-mesh filter.

5. A filter for liquids comprising a chamber having an inlet and outlet, a plurality of vertically disposed cylindrical filter elements therein each formed of fine mesh screening and positioned between the inlet and outlet to cause liquid entering the inlet to pass through said screens before emerging from the outlet, a relatively coarsely perforated element surrounding and spaced from each of said filter elements, a horizontal vertically movable member supporting said perforated elements in position about each filter element, at least two bell cranks each having one arm pivoted to said chamber and links coupling the other arm of each crank to said vertically movable member, means coupling said cranks causing them to operate in synchronism and means for imparting oscillatory motion to one of said cranks to vertically reciprocate said coarsely perforated elements.

References Cited in the file of this patent

UNITED STATES PATENTS

| | | |
|---|---|---|
| 403,073 | Rabitz | May 7, 1889 |
| 773,473 | Cassel | Oct. 25, 1904 |
| 774,349 | Cassel | Nov. 8, 1904 |
| 1,045,095 | Neil | Nov. 19, 1912 |
| 1,148,237 | Kneuper | July 27, 1915 |
| 1,472,574 | Wright | Oct. 30, 1923 |
| 1,510,863 | Rose | Oct. 7, 1924 |
| 1,547,368 | Dehne | July 28, 1925 |
| 1,579,171 | Zoul | Mar. 30, 1926 |
| 1,604,650 | Manning | Oct. 26, 1926 |
| 1,804,512 | Pickard | May 12, 1931 |
| 1,937,481 | Raisch et al. | Nov. 28, 1933 |
| 2,041,048 | Chesney | May 19, 1936 |
| 2,145,535 | Vokes | Jan. 31, 1939 |
| 2,214,943 | Tinsley | Sept. 17, 1940 |
| 2,221,210 | Soderquist | Nov. 12, 1940 |
| 2,300,789 | Kelley | Nov. 3, 1942 |
| 2,330,211 | Haney | Sept. 28, 1943 |
| 2,423,172 | Booth | July 1, 1947 |
| 2,549,063 | De Haven | Apr. 17, 1951 |

FOREIGN PATENTS

| | | |
|---|---|---|
| 8,440 | Great Britain | 1892 |
| 579,326 | France | July 30, 1924 |
| 692,266 | Great Britain | June 3, 1953 |